No. 12,380. REISSUED AUG. 15, 1905.

W. H. FISHER.

HYDRAULIC PRESSING MACHINE.

APPLICATION FILED MAY 12, 1905,

4 SHEETS—SHEET 1.

Witnesses

Jno Imirie

Chas. Morris.

Inventor

Willis H. Fisher.

By Stewart & Stewart

Attorneys

ANDREW B. GRAHAM CO., PHOTO-LITHOGRAPHERS, WASHINGTON, D. C.

No. 12,380. REISSUED AUG. 15, 1905.

W. H. FISHER.

HYDRAULIC PRESSING MACHINE.

APPLICATION FILED MAY 12, 1905,

4 SHEETS—SHEET 2.

Witnesses

Jno. Imirie

Chas. Morris.

Inventor

Willis H. Fisher

By Stewart & Stewart

Attorneys

ANDREW B. GRAHAM CO., PHOTO-LITHOGRAPHERS, WASHINGTON, D. C.

No. 12,380. REISSUED AUG. 15, 1905.

W. H. FISHER.

HYDRAULIC PRESSING MACHINE.

APPLICATION FILED MAY 12, 1905.

4 SHEETS—SHEET 3.

Inventor

Willis H. Fisher.

Witnesses

Jno Imrie

Chas. Morris.

By, Stewart & Stewart

Attorneys

ANDREW B. GRAHAM CO., PHOTO-LITHOGRAPHERS, WASHINGTON, D. C.

No. 12,380.

REISSUED AUG. 15, 1905.

W. H. FISHER.

HYDRAULIC PRESSING MACHINE.

APPLICATION FILED MAY 12, 1905.

4 SHEETS—SHEET 4.

Witnesses

Jno Imirie

Chas. Morris

Inventor

Willis H. Fisher

By, Stewart & Stewart

Attorneys

ANDREW B. GRAHAM CO., PHOTO-LITHOGRAPHERS, WASHINGTON, D. C.

UNITED STATES PATENT OFFICE.

WILLIS H. FISHER, OF MOUNT GILEAD, OHIO.

HYDRAULIC PRESSING-MACHINE.

No. 12,380. Specification of Reissued Letters Patent. Reissued Aug. 15, 1905.

Original No. 785,602, dated March 21, 1905. Application for reissue filed May 12, 1905. Serial No. 260,180.

*To all whom it may concern:*

Be it known that I, WILLIS H. FISHER, a citizen of the United States, residing at Mount Gilead, in the county of Morrow and State of Ohio, have invented new and useful Improvements in Hydraulic Pressing-Machines, of which the following is a specification.

My invention relates to hydraulic pressing-machines; and the object of the invention is mainly for pressing or forming artificial stone from a plastic state to a solid mass.

My invention also consists in providing the press with a frame adapted to extend around the mold-box when the box is in position to prevent the box from bulging when pressure is applied, the sides of the box being adjustable in order to adapt the press to receive mold-boxes of different widths.

My invention also consists in providing the mold-box frame with means whereby the end gates of the frame may be locked in position when the sides are adjusted for various widths of mold-boxes.

My invention also consists in means whereby the sides of the frame are adjusted.

My invention also consists in means for supporting the mold-box with its body off the platen when the platen is in its lowest position in order that the mold-box may be readily removed and placed in position.

My invention further consists in certain constructions and combination of parts, the preferred form of which will be first described and then the invention pointed out in the claims.

Figure 1:
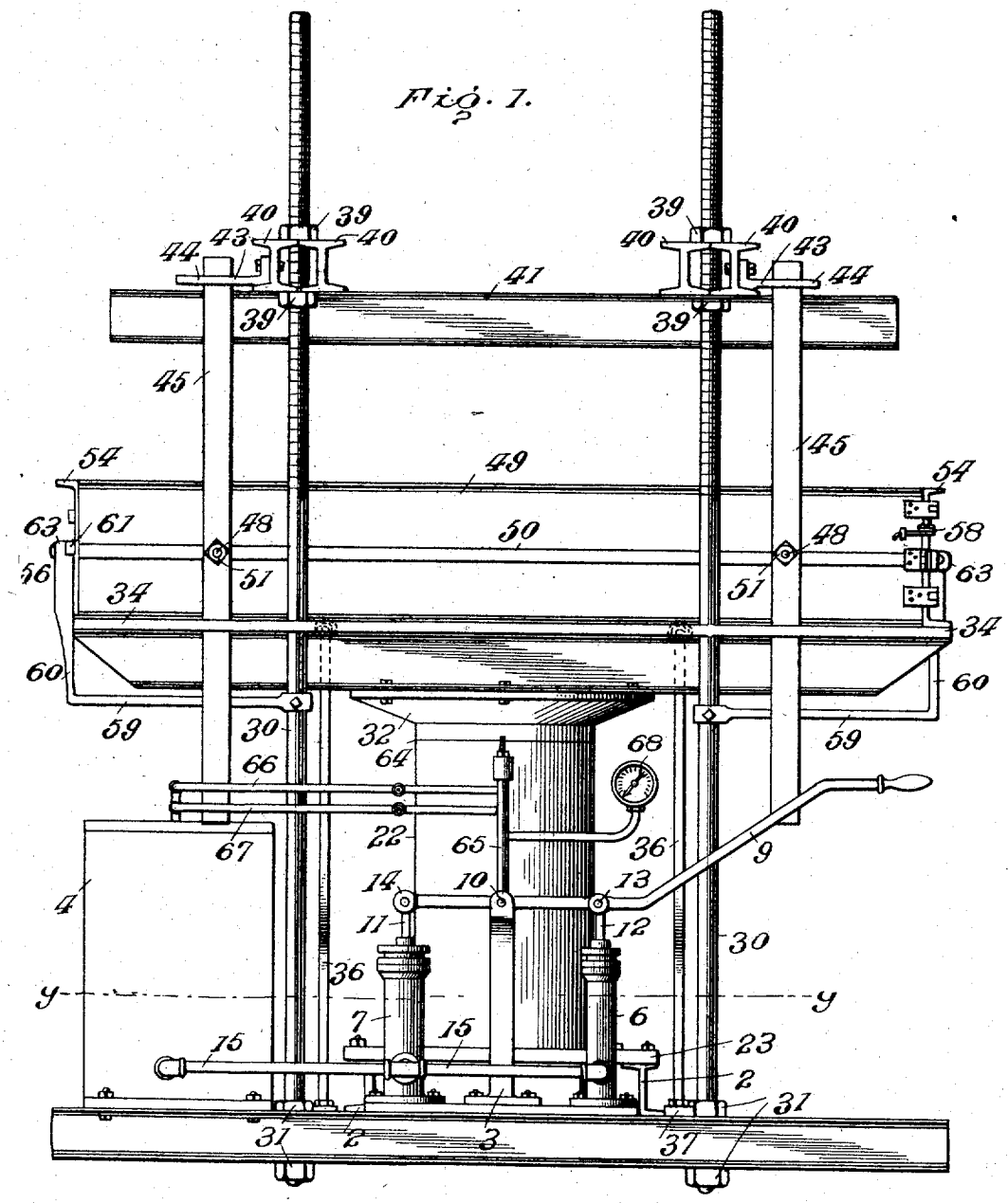
Figure 2:
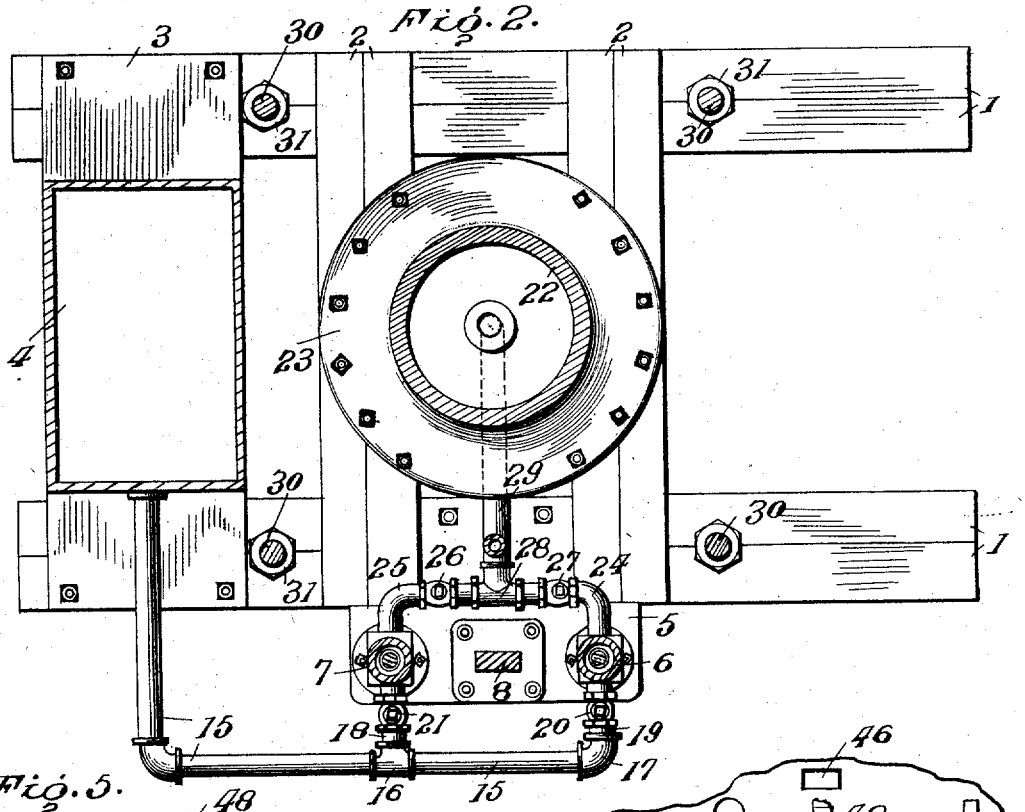
Figure 5:
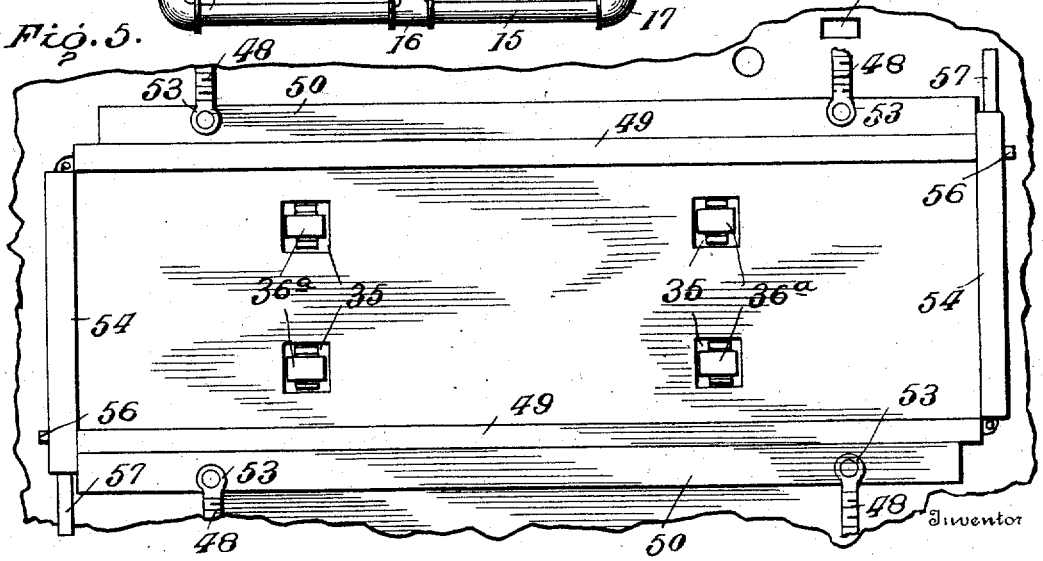
Figure 3:
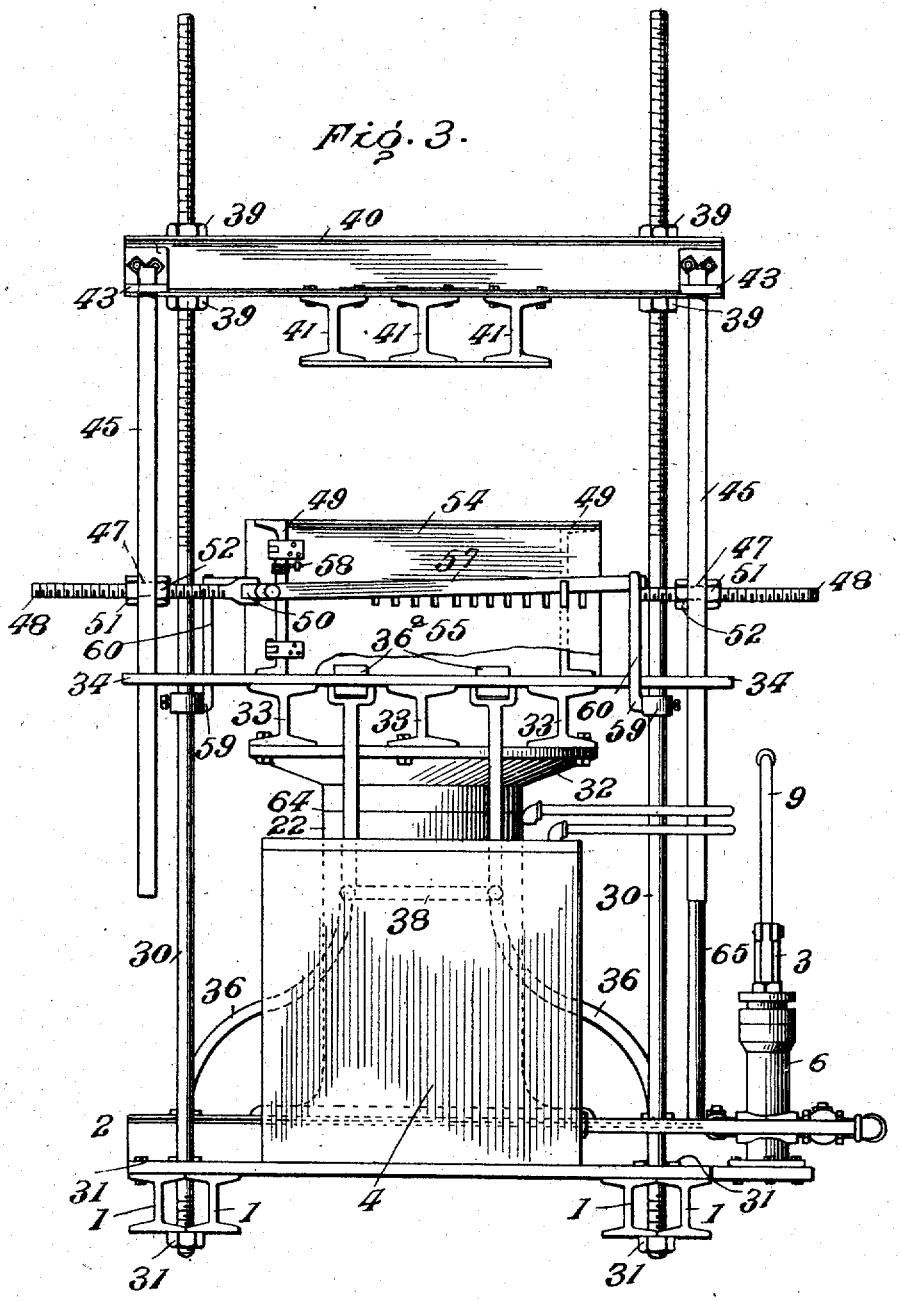
Figure 4:
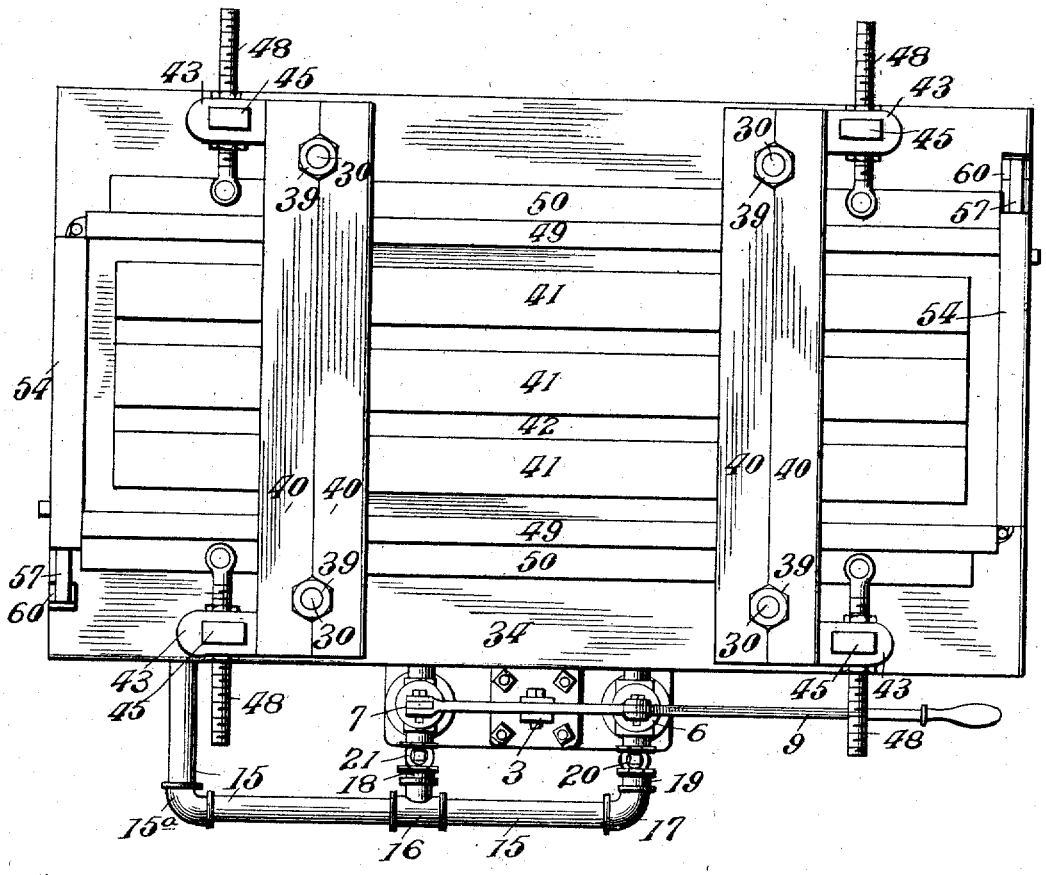

Referring to the drawings, wherein the same part is designated by the same reference-numeral wherever it occurs, Figure 1 is a side elevation of the machine. Fig. 2 is a sectional plan view taken on line Y Y of Fig. 1. Fig. 3 is an end view in elevation. Fig. 4 is a top plan view of the invention. Fig. 5 is a top plan view in detail of the bottom plate of the machine upon which a molding-box is placed preparatory for putting on the power to solidify the material into a hard stone, also disclosing the position of an adjustable supporting-frame which surrounds the molding-box to prevent said box from spreading under pressure. Said figure also discloses small rollers or trucks that protrude through openings in said plate a sufficient distance to admit the molding-box to be placed in the machine and taken out of the machine after the pressure has been applied without overexhaustion.

My hydraulic-pressure machine consists wholly of metal—such as iron, steel, &c.—and which I will now further proceed to describe by referring to corresponding numerals on the drawings and specification, in which—

1 designates longitudinal foundation-sills constructed of double I-beams placed side by side. Central and crosswise of said sills are two supporting-beams 2. These are also constructed of I-beam material of double thickness. On the outer end of said supporting-sills, rigidly secured to said sills, is a plate 3. The object of said plate is to support a water-tank 4, which will be referred to farther on.

Central of one of the supporting-sills 1 is a projecting platform 5, which is rigidly secured to said sill. The object of this platform is to support two force-pumps 6 and 7, also to support a vertical standard 8, located between the two pumps, which is adapted to carry a lever 9 to operate said pumps. Said lever is pivotally secured at 10 in the top of said standard. Valve-stems 11 and 12 extend upward above the top of each pump and are secured to said lever 9 at 13 and 14.

Leading from the tank 4 and intersecting indirectly with the pumps 6 and 7 is a pipe 15. Said pipe is jointed to elbow 15[a] and to T-joint 16, extending to elbow 17. Extending from said pump 7 and from elbow 17 to pump 6 are short sections of pipe 18 and 19, provided with check-valves 20 and 21, which admit water to flow through pipes 15 and through short sections 18 and 19 to the pumps on each alternate movement of the pump-handle 9, but prevent the return of the water through pipes 15 back to the tank 4.

Central of the foundation-sills and central of the two supporting-beams 2, resting on said sills, is mounted a hydraulic ram 22, which is provided with a sufficient flange or base 23 at its lower end to make it secure to said supporting-beams by bolts, as shown.

Extending inward from the pumps 6 and 7 are short sections of curved pipe 24 and 25, intersecting, through valve-seats 26 and 27, to a T-joint 28. Extending from said T-joint inward and central of the lower end of the hydraulic ram is a pipe 29, which is made secure at said lower end, as indicated. This section 29 completes a connection from tank 4 to the inside of the hydraulic ram by way of the under side.

Vertically secured to the foundation-sills 1 are four heavy strain-rods 30. These strain-rods are rigidly secured to the foundation-sills 1 by means of threaded nuts 31, on the under and over edges thereof.

Secured to the adjustable top end 32 of the hydraulic ram 22 are three I-beams 33. Mounted upon these is a strong plate or table 34. This table is provided with sufficient rectangular openings 35 to admit the faces of rollers 36[a] to pass a short distance above its upper face. The object of this table 34 is to carry the molding-box when filled with the plastic material ready for pressing. These rollers 36[a] are mounted on the top ends of a frame or stationary standards 36. These stationary standards are rigidly secured to the longitudinal foundation-sills at 37 and are provided with a strengthening cross-tie 38. The upper ends of the strain-rods 30 are screw-threaded and are provided with corresponding screw-threaded nuts 39. Mounted between said nuts 39 are cross-beams 40. Suspended to said cross-beams 40 are three longitudinal I-beams 41. Suspended to said I-beams is a plate 42.

Secured to the cross-beams 40 at their outer ends are horizontally-extending brackets 43. Said brackets are provided with elongated openings 44. Passing through said openings are vertical guide-bars 45. These guide-bars extend downwardly through elongated openings 46 in the table 34. (Clearly shown in the broken detail view at Fig. 5.) These guide-arms 45 are further provided with one opening 47 through each. Passing through these openings loosely are screw-threaded horizontal arms 48. On the inner end of said arms are rigidly secured bars 49, constructed of channel-iron. These bars are from six to ten inches wide, as the case may be, and are provided with longitudinal ribs or reinforcements 50. The inner ends of the screw-threaded arms 48 are forked or bifurcated, so that they may straddle the ribs or reinforcements 50 of the side bars 49 and are secured thereto by means of rivet or screw bolt 53. (Also clearly indicated at Fig. 5.) These arms 48 are provided with nuts 51 and 52, correspondingly screw-threaded. The object of these nuts is to rigidly adjust the bars 49 inward or outward, as the occasion may demand. The main object of these adjustable bars is to prevent the sides of a molding-box from spreading when the pressure upon the product in the box is applied. It will be seen that by adjusting the nuts 52 on the sides of the bars the sides of the mold-box frame, formed by the bars 49, may be adjusted toward and from each other in order to adapt the frame for various sizes of mold-boxes.

The molding-box referred to is not illustrated with any part of this invention. The reason that I do not illustrate it herein is because I consider it an independent invention apart from my hydraulic pressing-machine.

One form of mold-box which is adapted for use in connection with my machine is that shown in my application, Serial No. 224,905, filed September 17, 1904.

The side bars 49 referred to and the end gates 54 are hinged, as shown at their diagonal corners, and are further provided with a series of elongated openings 55, and the side bars at their opposite corners are provided with extensions 56. These extensions are notched, as can be seen more clearly at 56 in Fig. 1. These extensions are adapted to be inserted through the elongated openings 55 of the end gates and may be inserted through the first, second, or third openings, &c., according to the width of the molding-box that is to be inclosed by the side bars 49 and end gates 54.

In order to make the end gates secure, I have provided latch-bars 57. Said latch-bars are pivotally secured at the hinged ends of the gates 54, as shown. When the gates are to be locked, the notched extensions 56 of the side bars 49 are passed through one of the openings 55. When the molding-box is filled with the plastic material, it is shoved in between the side bars 49 when said side bars are tightly adjusted against the sides of the molding-box, and the open end, where the box is shoved in, is then closed by closing the gates 54, allowing the latch-bar to drop into the notched extension 56. The molding-box is then secured by the strong sides 49 and end gates 54. I have further provided a coil-spring 58, one end of which is secured to the side bars 49 and the other end to the end gates 54. When the latch-bar 57 is in locked position, I have provided means to automatically unlock it, which consists of an L-shaped arm 59, rigidly secured to the strain-rods 30.

The vertical portions 60 of the arms 59 are notched, and when the end gates 54 are closed the ends of the latch-bars 57 engage said notches at 61. On the ascent of the portion 32 of the hydraulic ram 20 said latch-bars automatically disengage from said notches, when the portions 60 will spring inward, as indicated by dotted lines, sufficiently so that the extreme upper ends of the vertical portions 60 of arms 59 will stand in the path of the ends 61 of latch-bars 57 on the descent of the hoisting portion 32 of the hydraulic ram 22, when the spring 58 will cause the end gates to swing open, so that the mold-box can be removed from the pressing-machine after the stone is compact.

The operation of my invention is as follows: The molding-box is filled with the material for making the artificial stone in its plastic state. The box is then placed in position on the projecting roller 35, which projects through table 34. The side bars and ends 57 are then adjusted to snugly inclose the molding-box. The tank 4 is filled with water, and the pumps are started by the up-and-down movement of pump-handle 9. The water is forced through pipe 29 and through the lower end of the hydraulic ram 22, when the pressure in the ram will cause the upper portions 32 to rise from the joint 64 until the depending plate 42 will snugly engage the inside of the molding-box. Before the process of forming the artificial stone is commenced it will be observed that I have made pump 7 larger than pump 6. I do this so that every alternate blow caused by the movement of the pump-handle will be much greater or have a greater effect on the upward pressure than that caused by the smaller pump. These alternate blows or pressures have a tendency to more firmly compact the plastic material than an even pressure or equal blows. When the material is thoroughly compact, the larger pump is released from duty; but the smaller pump, which I call my "power-pump," is continued in operation until the material is compact to its extreme extent. I have further provided for the return of the waste water to the tank 4, which passes upward through a stand-pipe 65, thence through pipes 66 and 67, which are provided with proper check-valves, back to the tank 4. I have also provided a pressure-gage 68 to indicate a sufficient amount of pressure.

Having now fully described my invention, what I claim as new, and desire to secure by Letters Patent of the United States, is—

1. In a press, the combination with a movable platen and means to operate the same, of a head, a mold-box adapted to be pressed by the platen against the head, a frame adapted to surround the mold-box to prevent the same from spreading under pressure, and means for adjusting the sides of the frame toward each other to clamp the mold-box.

2. In a press, the combination with a movable platen and means to operate the same, of a head, a mold-box adapted to be pressed, by the platen against the head, a frame composed of two sides and two ends adapted to surround the mold-box to prevent the same from spreading under pressure, means for adjusting the sides of the frame toward and away from each other, and means whereby the ends may be secured to the sides in different positions of adjustment.

3. In a press, the combination with a movable platen and means to operate the same, of a head, a mold-box adapted to be pressed by the platen against the head, a frame composed of two sides and two ends, means for adjusting the sides toward and away from each other, whereby the frame is adapted to receive boxes of different sizes and means for securing the free ends of the sides and ends together when the sides are in different positions of adjustment.

4. In a press, the combination with a movable platen and means to operate the same, of a head, a mold-box adapted to be supported on the platen and pressed against the head, a frame separate from, but movable with the platen and adapted to surround the mold-box to prevent the same from spreading under pressure, and means for adjusting the sides of the frame toward and away from each other, whereby the frame is adapted to receive boxes of different sizes.

5. In a press, the combination with a movable platen and means to operate the same, of a head, a mold-box adapted to be pressed by the platen against the head, a frame adapted to surround the mold-box to prevent the same from spreading under pressure and guide-rods to which the sides of the frame are adjustably connected whereby the frame is adapted to receive boxes of different sizes.

6. In a press, the combination with a movable platen and means to operate the same, of a mold-box adapted to be placed on the platen, fixed means extending above the platen to support the mold-box out of engagement with the platen when the platen is depressed.

7. In a press, the combination with a vertical movable platen provided with openings and adapted to receive a mold-box, of fixed means projecting through said openings and supporting the box out of contact with the platen when it is depressed, but allowing the body of the box to contact with the platen when the platen is raised.

8. In a press, the combination with a suitable frame, of a platen, means to operate the same, said platen being provided with openings, stationary standards extending up and adapted to pass through the openings when the platen is depressed to support the mold-box off the platen.

9. In a press, the combination with a suitable frame, of a platen and means to operate the same, a head carried by the frame and located opposite to the platen, guide-rods, guides adapted to guide the rods, and a frame having its sides adjustably connected to the guide-rods, said frame being adapted to surround the mold-box supported on the platen to prevent the same from spreading under pressure.

10. In a press, the combination with a vertically-movable platen, of means to operate the same, a head in fixed relation thereto, a mold-box frame and means for automatically opening said frame.

11. In a press, the combination with a vertically-movable platen, of means to operate the same, a mold-box frame, an end gate pivoted upon the frame and automatic means for releasing the gate.

12. In a press, the combination with a vertically-movable platen, of means to operate the same, a mold-box frame, an end gate pivoted upon the frame, automatic means for releasing the gate, and means for swinging the gate.

13. In a press, the combination with a vertically-movable platen, of means to operate the same, a mold-box frame, an end gate pivoted upon the frame, said frame being adapted to move with the platen and means operatable upon the downward movement of the frame to open the end gate.

14. In a press, the combination with a vertically-movable platen, of means to operate the same, a mold-box frame, an end gate pivoted upon the frame, a latch for securing the gate, said frame being adapted for movement with the platen and means adapted to move into the path of the latch during the upward movement of the frame to engage the latch and release the gate during the downward movement of the frame.

15. In a hydraulic pressing-machine of a suitable frame, a hydraulic ram mounted and carried by said frame, pumps adapted to actuate said ram, a movable top carried by the ram adapted to move upward and downward, I-beams mounted on said movable top, a table carried by said I-beams, rectangular openings in said table, rollers adapted to pass through said openings, stationary curved standards extending upward adapted to carry said rollers, vertical strain-rods mounted on the foundation-sills, cross-beams adjustably carried by said strain-rods, extending brackets 43, mounted to said cross-beams, substantially as described.

16. In a hydraulic pressing-machine of the character described, of a suitable frame, a hydraulic ram mounted and carried by said frame, pumps adapted to actuate said ram, a lever adapted to actuate said pumps, a table mounted over said ram, strain-rods adapted to adjustably carry cross-beams and guide said table on its upward and downward movements, depending guide-rods adapted to loosely engage elongated openings in said table and extended brackets carried by said cross-beams, substantially as described.

17. In a hydraulic pressing-machine adapted for the manufacture of artificial stone of a suitable frame, a hydraulic ram mounted and carried by said frame, pumps adapted to actuate said ram, a lever adapted to actuate said pumps, vertical strain-rods, I-beams mounted on the ram, a table resting on the I-beams, cross-beams adjustably carried by said strain-rods, guide-bars adapted to engage extended brackets and elongated openings in said table, adjustable arms carried by said guide-bars, box-supporting side bars connected to and actuated by said adjustable arms, adjustable end supporting-gates secured to said side bars, substantially as described.

18. In a hydraulic pressing-machine of a suitable frame comprising longitudinal sills, cross-beams mounted on said sills a hydraulic ram mounted on said cross-beams, pumps adapted to actuate said ram, a lever 9 adapted to actuate said pumps, vertical strain-rods mounted and carried by the foundation-sills, cross-beams carried by the hydraulic ram and adapted to move upward, a table mounted on said cross-beams, a supporting-frame resting on said table, adjustable arms secured to the supporting-frame, supported by guide-rods, cross-beams adjustably carried by the strain-rods, longitudinal I-beams dependingly carried by said adjustable cross-beams, a plate carried by said depending beams, substantially as described.

19. In a hydraulic pressing-machine of the character described, a suitable frame, a hydraulic ram mounted on the foundation of said frame, pumps adapted to actuate said ram, I-beams mounted thereon, a table carried by said I-beams, a supporting-box carried by said table, adjustable swinging ends mounted to the sides of said box, latch-bars mounted to said supporting-box adapted to secure the end of said box in position, cross-beams, arms mounted to said strain-rods and adapted to disengage said latch-bars, depending I-beams carried by said cross-beam, a plate carried by said depending beams and adapted to come in engagement with a suitable molding-box, substantially as described.

Signed by me at Baltimore, Maryland, this 4th day of May, 1905.

WILLIS H. FISHER.

Witnesses:
GEO. W. HAULENBEEK,
JNO. P. BULLINGTON.